United States Patent
Wu et al.

(10) Patent No.: US 11,259,323 B2
(45) Date of Patent: Feb. 22, 2022

(54) RANDOM ACCESS METHOD AND USER EQUIPMENT

(71) Applicant: VIVO MOBILE COMMUNICATION CO.,LTD., Guangdong (CN)

(72) Inventors: Yumin Wu, Chang'an Dongguan (CN); Li Chen, Chang'an Dongguan (CN)

(73) Assignee: VIVO MOBILE COMMUNICATION CO., LTD., Chang'An Dongguan (CN)

( * ) Notice: Subject to any disclaimer, the term of this patent is extended or adjusted under 35 U.S.C. 154(b) by 17 days.

(21) Appl. No.: 16/652,064

(22) PCT Filed: Oct. 11, 2018

(86) PCT No.: PCT/CN2018/109806
§ 371 (c)(1),
(2) Date: Mar. 29, 2020

(87) PCT Pub. No.: WO2019/085718
PCT Pub. Date: May 9, 2019

(65) Prior Publication Data
US 2020/0252966 A1 Aug. 6, 2020

(30) Foreign Application Priority Data
Nov. 3, 2017 (CN) .......................... 201711072301.5

(51) Int. Cl.
*H04W 72/04* (2009.01)
*H04W 74/08* (2009.01)
(Continued)

(52) U.S. Cl.
CPC ....... *H04W 74/0808* (2013.01); *H04L 1/0026* (2013.01); *H04L 5/0092* (2013.01);
(Continued)

(58) Field of Classification Search
CPC ............ H04W 74/0808; H04W 76/27; H04W 24/10; H04W 72/046; H04W 80/02; H04W 74/0833; H04L 1/0026
See application file for complete search history.

(56) References Cited

U.S. PATENT DOCUMENTS

2015/0382205 A1 12/2015 Lee et al.
2016/0157267 A1 6/2016 Frenne et al.
(Continued)

FOREIGN PATENT DOCUMENTS

CN 106385710 A 2/2017
CN 106900074 A 6/2017
(Continued)

OTHER PUBLICATIONS

EP Search Report in Application No. 18872713.5 dated Oct. 16, 2020.
(Continued)

*Primary Examiner* — Fahmida S Chowdhury
(74) *Attorney, Agent, or Firm* — Maschoff Brennan

(57) ABSTRACT

A random access method and a user equipment are provided. The random access method includes: acquiring configuration information, where the configuration information includes random access resource configuration information of at least two beams; acquiring signal quality measurement result information of the at least two beams; selecting at least one beam according to the signal quality measurement result information of the at least two beams; an determining a random access resource of the at least one beam according to the random access resource configuration information of the at least one beam, and initiating a random access on the determined random access resource through the at least one beam.

20 Claims, 4 Drawing Sheets

(51) Int. Cl.
*H04W 76/27* (2018.01)
*H04L 1/00* (2006.01)
*H04L 5/00* (2006.01)
*H04W 24/10* (2009.01)
*H04W 80/02* (2009.01)

(52) U.S. Cl.
CPC ......... *H04W 24/10* (2013.01); *H04W 72/046* (2013.01); *H04W 76/27* (2018.02); *H04W 80/02* (2013.01)

(56) References Cited

U.S. PATENT DOCUMENTS

| | | | |
|---|---|---|---|
| 2018/0132252 A1* | 5/2018 | Islam | H04B 7/0617 |
| 2018/0235013 A1* | 8/2018 | Jung | H04W 74/0833 |
| 2019/0349830 A1* | 11/2019 | Peisa | H04B 7/0413 |
| 2020/0187258 A1* | 6/2020 | Lee | H04W 74/0833 |
| 2020/0187259 A1 | 6/2020 | Liu | |
| 2021/0112591 A1* | 4/2021 | Lee | H04W 74/008 |

FOREIGN PATENT DOCUMENTS

| | | |
|---|---|---|
| CN | 107223361 A | 9/2017 |
| EP | 3 664 564 A1 | 7/2018 |

OTHER PUBLICATIONS

"Beam Management Procedures in Beam Based Access" 3GPP TSG-RAN WG1#86, Aug. 22, 2016.
"4-step random access procedure" 3GPP TSG RAN WG1 NR Ad-hoc#2, Jun. 27, 2017.
"Consideration on the 4-step random access procedure" 3GPP TSG-RAN WG2 Meeting #98, May 15, 2017.
"Considerations on Multiple Beams RACH Procedure" 3GPP TSG RAN WG1 Meeting #87, Nov. 14, 2016.
CN Office Action in Application No. 201711072301.5 dated Apr. 8, 2020.
"Beam Selection for Handover in NR" 3GPP TSG-RAN WG2 Meeting #99bis dated Oct. 9, 2017.
Written Opinion and International Search Report in Application No. PCT/CN2018/109806 dated May 14, 2020.

\* cited by examiner

RANDOM ACCESS METHOD AND USER EQUIPMENT

CROSS REFERENCE OF RELATED APPLICATION PROGRAM

The present application is the U.S. national phase of PCT Application PCT/CN2018/109806 filed on Oct. 11, 2018, which claims a priority of Chinese patent application No. 201711072301.5 filed on Nov. 3, 2017, which is incorporated herein by reference in its entirety.

TECHNICAL FIELD

The present disclosure relates to the field of communications technologies, and in particular to a random access method and a user equipment.

BACKGROUND

Compared with the mobile communication system in the related art, various new functions will be introduced in the 5G communication system, such as Master Cell Group (MCG) bearer, Secondary Cell Group (SCG) bearer, Split Bearer, or Duplicate Bearer, and the concepts of Bandwidth Part (BWP) and Beam will also be introduced. In the 5G communication system, a user equipment may have multiple beams, and in a random access process, the user equipment may need to initiate a random access through only a part of the beams, for example, initiating a random access through one beam. In this way, how to select a beam to initiate a random access process is a technical issue that needs to be solved immediately at present.

SUMMARY

In a first aspect, a random access method is provided in an embodiment of the present disclosure, including:
acquiring configuration information, where the configuration information includes random access resource configuration information of at least two beams;
acquiring signal quality measurement result information of the at least two beams;
selecting at least one beam according to the signal quality measurement result information of the at least two beams; and
determining a random access resource of the at least one beam according to the random access resource configuration information of the at least one beam, and initiating a random access on the determined random access resource through the at least one beam.

In a second aspect, a User Equipment (UE) is provided in an embodiment of the present disclosure, including:
a first acquiring module, configured to acquire configuration information, where the configuration information includes random access resource configuration information of at least two beams;
a second acquiring module, configured to acquire signal quality measurement result information of the at least two beams;
a selecting module, configured to select at least one beam according to the signal quality measurement result information of the at least two beams; and
a random access module, configured to determine a random access resource of the at least one beam according to the random access resource configuration information of the at least one beam, and initiate a random access on the determined random access resource through the at least one beam.

In a third aspect, a user terminal is further provided in an embodiment of the present disclosure, including a memory, a processor and a program stored in the memory and executable on the processor, where the program is executed by the processor to perform the random access method hereinabove.

In a fourth aspect, a computer-readable storage medium is further provided in an embodiment of the present disclosure, where a program is stored in the computer-readable storage medium, and the program is executed by a processor to perform the random access method hereinabove.

BRIEF DESCRIPTION OF THE DRAWINGS

In order to illustrate the technical solution of the embodiments of the present disclosure more clearly, the drawings used in the description of the embodiments of the present disclosure will be briefly described below. Obviously, the drawings in the following description are just some embodiments of the present disclosure. For those of ordinary skill in the art, other drawings may be obtained based on these drawings without creative work.

DETAILED DESCRIPTION

In the following, the technical solutions in the embodiments of the present disclosure will be clearly and completely described with reference to the drawings in the embodiments of the present disclosure. Obviously, the described embodiments are part of the present disclosure, but not all of them. Based on the embodiments of the present disclosure, all other embodiments obtained by a person of ordinary skill in the art without creative work shall fall within the scope of the present disclosure.

Figure 1:
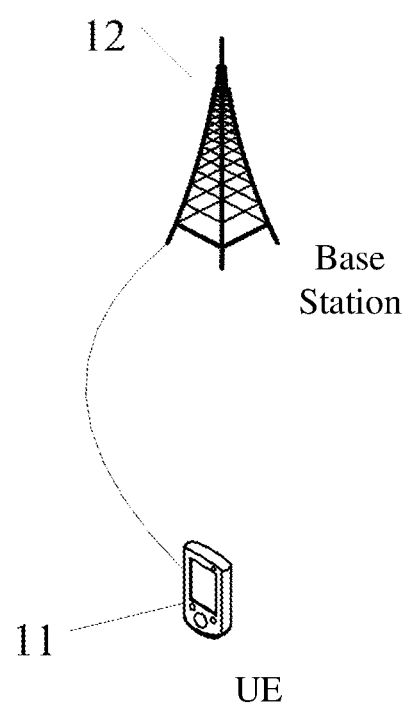
FIG. 1 is a structural diagram of a random access system in an embodiment of the present disclosure.

FIG. 1 is a structural diagram of a random access system in an embodiment of the present disclosure. As shown in FIG. 1, the random access system includes a user equipment 11 and a base station 12, where the user equipment 11 may be a UE (User Equipment), For example: it can be a mobile phone, a tablet personal computer, a laptop computer, a personal digital assistant (PDA), a mobile Internet device (MID), or a wearable device (Wearable Device) and other terminal-side devices, it should be noted that the specific type of the user equipment 11 is not limited in the embodiment of the present disclosure. The above base station 12 may be a base station of 5G and later versions (for example, gNB, 5G NRNB), or a base station in another communication system, or referred to as a NodeB. It should be noted that, in the embodiment of the present disclosure, a 5G base station is only as an example, the specific type of the base station 12 is not limited.

It should be noted that the specific functions of the above-mentioned user equipment 11 and base station 12 will be specifically described through the following embodiments.

Figure 2:
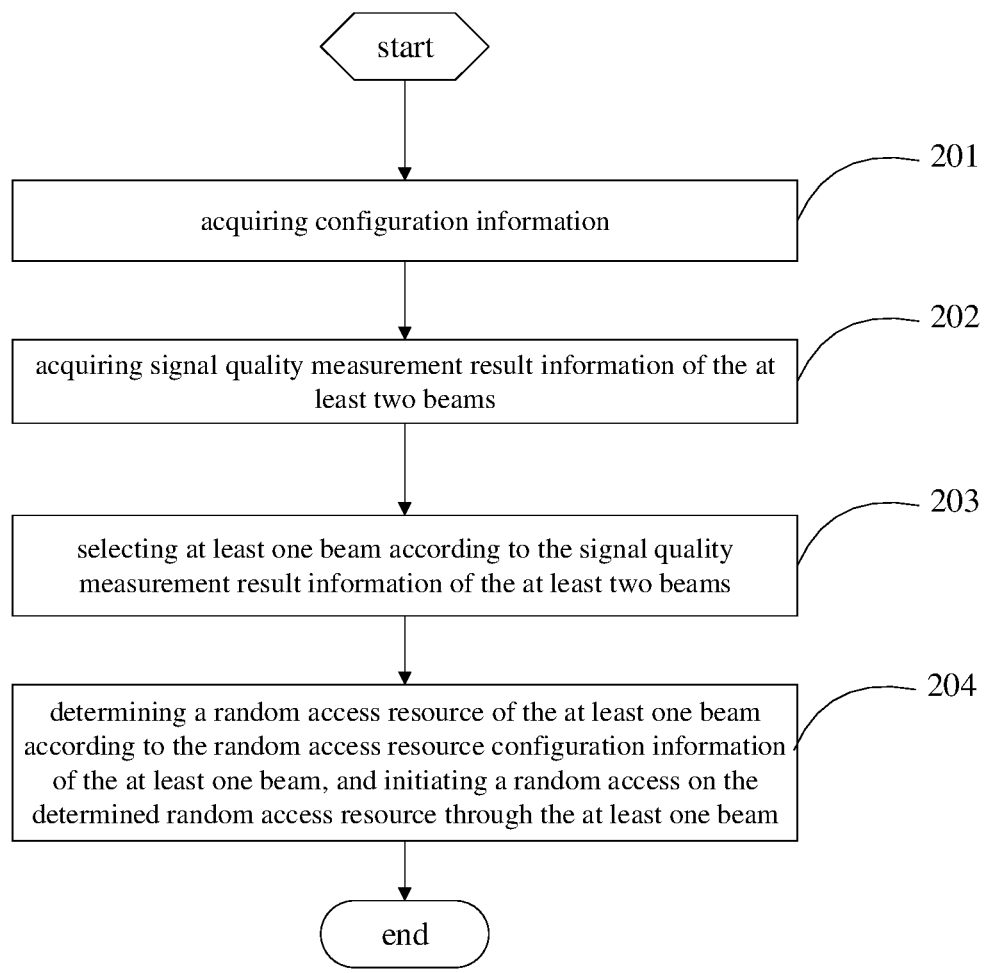
FIG. 2 is a schematic diagram of a random access method in an embodiment of the present disclosure.

FIG. 2 is a flowchart of a random access method in an embodiment of the present disclosure. The method is applied to a user equipment. As shown in FIG. 2, the method includes the following steps:

Step 201: acquiring configuration information, where the configuration information includes random access resource configuration information of at least two beams.

The above configuration information is configured by the network side or defined by the protocol, and the above configuration information may configure one random access resource configuration information for each beam of the user equipment. The random access resource configuration information of each beam may indicate the random access resource of the corresponding beam, for example, indicate at least one of a time domain resource, a spatial domain resource, a frequency domain resource and a coding resource of the random access resource of the beam.

Of course, the above configuration information may also include a signal quality threshold configuration, and the signal quality threshold configuration may include a signal quality measurement threshold, and may further include a measurement result type and a reference signal type corresponding to the measurement result, where the measurement result type may include Reference Symbol Received Power (RSRP) or Reference Signal Received Quality (RSRQ) or Signal to Interference plus Noise Ratio (SINR). The reference signal type may include a Synchronization Signal Block (SSB) or a Channel State Information Reference Signal (CSI-RS).

In addition, the above acquired configuration information may be the configuration information received at a Radio Resource Control (RRC) layer or a physical (PHY) layer, and after receiving the configuration information, the RRC layer or the PHY layer may indicate the configuration information to a Media Access Control (MAC) layer.

Step 202: acquiring signal quality measurement result information of the at least two beams.

The step 202 may be performing a signal quality measuring for each beam to obtain signal quality measuring information of each beam, where the measurement here may be a measurement of a reference signal, for example, a measurement of SSB or CSI-RS, and the measurement result obtained may be RSRP, RSRQ or SINR. In addition, the measurement time of the beams may be different, and each measurement result may have a certain timeliness.

Step 203: selecting at least one beam according to the signal quality measurement result information of the at least two beams.

The selection at least one beam here may be, according to the measurement result of each beam, selecting the beam with the best measurement result, or selecting a beam with a measurement result equal to or greater than the signal quality measurement threshold, and the like, and in different implementations, one or more beams may be selected.

Step 204: determining a random access resource of the at least one beam according to the random access resource configuration information of the at least one beam, and initiating a random access on the determined random access resource through the at least one beam.

After the at least one beam is selected, the random access resources of the beams may be determined according to the random access resource configuration information of the beams, and then a random access may be initiated on the determined random access resource through the corresponding beam. If multiple beams are selected in step 203, a random access resource may be selected from the random access resources of these multiple beams and a random access may be initiated through the corresponding beam. If only one beam is selected in step 203, a random access may be initiated through this beam and on the random access resource of this beam.

The initiated random access may be a contention-based random access or a non-contention-based random access.

According to the above embodiment of the present disclosure, the random access may be initiated selectively, and a beam with a better or a best signal quality may be selected for initiating the random access, thereby improving the success rate of random access.

It should be noted that the above methods in the above embodiments of the present disclosure may be applied to 5G systems, but there is no limitation, the method may also be applied to other communication systems as long as the same functions may be achieved, such as, but not limited to the 6G system, etc.

According to the embodiment of the present disclosure, configuration information is acquired, where the configuration information includes random access resource configuration information of at least two beams, signal quality measurement result information of the at least two beams is acquired, at least one beam is selected according to the signal quality measurement result information of the at least two beams, and a random access resource of the at least one beam is determined according to the random access resource configuration information of the at least one beam, and a random access is initiated on the determined random access resource through the at least one beam. In this way, according to the signal quality measurement results of the beams, a corresponding random access resource is selected, and a random access may be initiated on the corresponding random access resource through the corresponding beam, a beam with a good signal quality may be selected for initiating the random access, thereby improving the success rate of random access.

Figure 3:
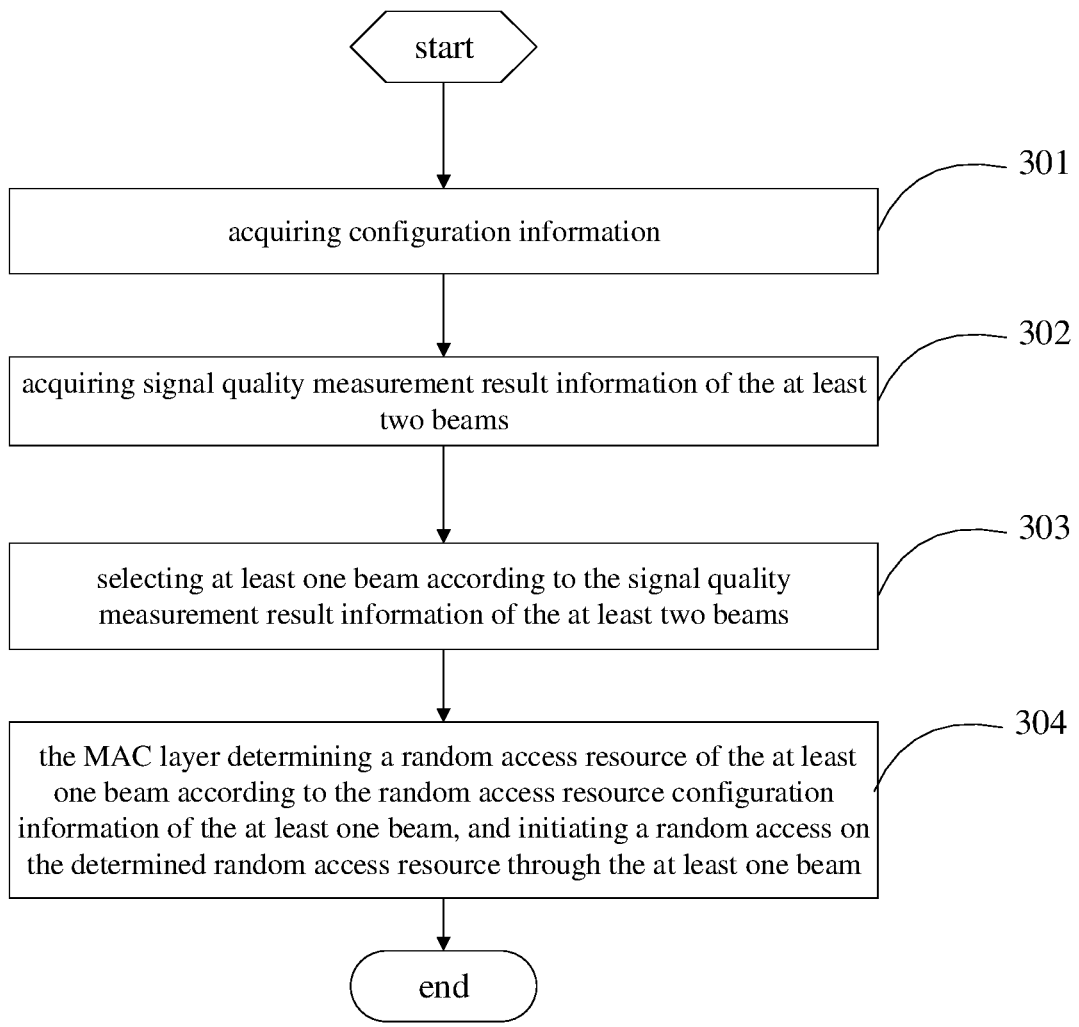
FIG. 3 is a another schematic diagram of a random access method in an embodiment of the present disclosure.

FIG. 3 is another flowchart of a random access method in an embodiment of the present disclosure. The method is applied to a user equipment. As shown in FIG. 3, the method includes the following steps:

Step 301: acquiring configuration information, where the configuration information includes random access resource configuration information of at least two beams.

The random access resource configuration information of each beam includes one or more of:

time resource configuration information, frequency resource configuration information, coding resource configuration information and spatial resource configuration information.

Through the above information, the random access resource of each beam may be accurately determined.

It should be noted that if some of the above four configuration information are not received in step 301, these configuration information may be determined through pre-configuration or protocol definition.

In addition, the time resource configuration information may include one or more of the following:

a radio frame configuration, a subframe configuration and a slot configuration.

The radio frame configuration may be a System Frame Number (SFN). The time of the random access resource of each beam may be accurately determined through the time resource configuration information.

The above frequency resource configuration information may include one or more of the following:

a frequency point identity, a minimum bandwidth agreed in a protocol, a Bandwidth Part (BWP) identity, a Physical Resource Block (PRB) identity, a cell identity and a sub-carrier interval.

The minimum bandwidth agreed in the protocol may be a predetermined minimum bandwidth in the protocol, for example, 5 MHz, the BWP identity may be a default BWP identity, or a currently activated BWP identity.

The frequency configuration of the random access resource of each beam may be accurately determined through the frequency resource configuration information.

The above coding resource configuration information includes a random access preamble, and of course, other coding resource configurations may also be included, which is not limited in the embodiments of the present disclosure.

The above-mentioned spatial resource configuration information may include one or more of the following:

identity information of beam, identity information of beam pair and a transmission node identity.

The identity information of the beams may be understood as that the identity information may be used to directly or indirectly determine the foregoing beams, and the identity information of the beam pair is the same, which will not be described repeatedly. For example, the identity information of the beam includes one or more of the following:

a Beam ID, a Synchronization Signal Block (SSB) identity and a Channel State Information Reference Signal (CSI-RS) identity.

In this embodiment, one beam may correspond to one SSB or CSI-RS, so that the beam may also be determined indirectly through the SSB identity or the CSI-RS identity. Of course, the above-mentioned beam pairs may also be determined in this indirect or direct manner.

Step 302: acquiring signal quality measurement result information of the at least two beams.

This step may be performing a signal quality measuring on the beam at the RRC layer or the PHY layer, and may specifically be performing a signal quality measurement on a reference signal corresponding to each beam.

Step 303: selecting at least one beam according to the signal quality measurement result information of the at least two beams.

In this step, the selecting the at least one beam may be performed at the MAC layer or the RRC layer PHY layer. For example, the selecting at least one beam according to the signal quality measurement result information of the at least two beams includes:

selecting, by a an MAC layer, at least one beam according to the signal quality measurement result information of the at least two beams provided by a RRC layer or a PHY layer; or instructing, by an MAC layer, a RRC layer or a PHY layer to provide the signal quality measurement result information of the at least two beams, and selecting, by the MAC layer, at least one beam according to the signal quality measurement result information of the at least two beams.

In this embodiment of the present disclosure, the signal quality measurement result information obtained by the measurement is provided to the MAC layer at the RRC layer or the PHY layer, and at least one beam is selected at the MAC layer, and the signal quality measurement result information may be provided actively through the RRC layer or the PHY layer, or provided according to the instruction of the MAC layer. For example, the RRC layer or the PHY layer provides the signal quality measurement result information to the MAC layer before selecting the random access resource; or the RRC layer or the PHY layer periodically provides the signal quality measurement result information to the MAC layer; or the RRC layer or the PHY layer provides the signal quality measurement result information to the MAC layer according to the providing request indicated by the MAC.

In this embodiment of the present disclosure, the RRC layer or the PHY layer may provide the signal quality measurement result information to the MAC layer before selecting the random access resource, which may ensure that the at least one beam is selected quickly and efficiently.

In addition, the RRC layer or the PHY layer may provide the signal quality measurement result information to the MAC layer periodically, thereby periodically updating the signal quality measurement result information, so that the selected beam is more accurate. The above period may be agreed by the protocol or configured by the network side.

In addition, the RRC layer or the PHY layer may also provide the signal quality measurement result information to the MAC layer according to the providing request indicated by the MAC, so that when the MAC needs the signal quality measurement result information, the signal quality measurement result information may be obtained in time, thereby improving the timeliness of the beam selection.

Optionally, if the signal quality measurement result information is provided by the RRC layer, the RRC layer itself may decide to provide the signal quality measurement result information to the MAC layer. If the signal quality measurement result information is provided by the PHY layer, the PHY layer provides the signal quality measurement result information to the MAC layer, or the PHY layer provides the signal quality measurement result information to the MAC layer according to an instruction of the RRC layer. The PHY layer providing the signal quality measurement result information to the MAC layer may refer to that the PHY itself decides to provide the signal quality measurement result information to the MAC layer.

For example, the RRC layer instructs the PHY layer to provide the signal quality measurement result information before the PHY layer selects the random access resource, and then the PHY layer provides the signal quality measurement result information to the MAC layer before selecting the random access resource. Alternatively, the RRC layer instructs the PHY layer to periodically provide the signal quality measurement result information, and then the PHY layer periodically provides the signal quality measurement result information to the MAC layer.

Because the PHY layer may provide the signal quality measurement result information to the MAC layer according to the instruction of the RRC layer, the PHY layer entity may be simplified.

In another embodiment, the selecting at least one beam according to the signal quality measurement result information of the at least two beams includes:

selecting, by a RRC layer or a PHY layer, the at least one beam according to signal quality measurement result information of the at least two beams and indicating, by the RRC layer or the PHY layer, the at least one beam to an MAC layer.

In this embodiment, the at least one beam described above may be selected at the RRC layer or the PHY layer, which can reduce the interaction between the protocol layers and simplify the process of initiating the random access process.

Optionally, if the acquired configuration information includes a signal quality measurement threshold, the measurement result of the selected at least one beam is equal to or greater than the signal quality measurement threshold, and the at least one beam satisfies a preset measurement condition. Specifically, at least one beam whose measurement result is equal to or greater than the signal quality measurement threshold and satisfying the preset measurement condition is selected from the at least two beams; or if the acquired configuration information does not include a signal quality measurement threshold, the at least one beam satisfies a preset measurement condition. Specifically, at least one beam that satisfies the preset measurement condition may be selected from the at least two beams.

In this implementation manner, the at least one beam may be selected according to the preset measurement condition and the signal quality measurement threshold, thereby ensuring that the signal measurement signal of the selected beam is better or the best, thereby improving the success rate of the random access.

Of course, in some embodiments, at least one beam may be selected only based on the signal quality measurement threshold, and the above preset measurement condition may not be taken into consideration, so that the beam with a better or best signal quality may be selected to improve the success rate of the random access.

The above-mentioned preset measurement condition may be pre-configured, and specifically may be pre-defined in a protocol or pre-configured by a network side. The preset measurement condition may include one or more of the following:

a corresponding reference signal is detected, the measurement result is a valid measurement result, and being in a downlink synchronization state, where each beam corresponds to one reference signal.

Since each beam corresponds to one reference signal, such as SSB or CSI-RS, in this way, through the above preset measurement condition, the selected beam may detect the corresponding reference signal, to ensure that the reference signal corresponding to the selected beam can be detected, so that the success rate of initiating a random access process using this beam is relatively high.

In addition, in this embodiment, the measurement results are time-effective, that is, the measurement result is available within a valid time, because the user equipment may perform multiple measurements, and the measurement result of each measurement are valid only within a specific time. For example, the measurement result of the $n^{th}$ measurement is valid before the $(n+1)^{th}$ measurement, or valid for a specific time after the $(n+1)^{th}$ measurement.

In this way, through the above preset measurement condition, the measurement result of the selected beam may be guaranteed to be valid, so that a suitable beam may be selected more accurately.

In addition, the being in the downlink synchronization state described above may refer to that the beam is downlink synchronized with the network side, so that the selected beam may be downlink synchronized, thereby improving the success rate of random access.

It should be noted that, because the preset condition may include one or more of the above three items, the selected beam may satisfy the above items. For example, a reference signal corresponding to a beam is detected and the beam is in the downlink synchronization state, and such beam is a selected, thereby further improving the success rate of random access.

Optionally, the acquired configuration information further includes at least one of a measurement result type and a reference signal type corresponding to the measurement result, the measurement result includes:

a measurement result of the measurement result type; or a measurement result of the reference signal type; or a measurement result of the measurement result type in a measurement result of the reference signal type.

The measurement result of the measurement result type in the measurement result of the reference signal type may be understood as that the measurement result is a measurement result of the reference signal type and a measurement result of the measurement result type. For example, if the reference signal type includes SSB and the measurement result type is RSRP, the measurement result is RSRP of SSB.

In this embodiment, the measurement result that is compared with the above-mentioned signal quality measurement threshold may be a measurement result of a specific type and a specific reference signal, so that the accuracy of selecting a beam may be improved.

In addition, it should be noted that the above-mentioned measurement result type and the above signal quality threshold type may be configured according to the protocol or network configuration, and the measurement result type and the above signal quality threshold type are the same. If the type of the signal quality threshold is RSRQ, the type of the measurement result for comparison is also RSRQ. In addition, the reference signal type corresponding to the measurement result and the reference signal type corresponding to the signal quality threshold may be configured according to the protocol or network, and they may be the same. For example, if the type of the signal quality threshold is SSB, the type of the measurement result for comparison is also SSB.

In this embodiment, in addition to improving the success rate of random access by acquiring different types of measurement results, the measurement result at a specific time may also be acquired to improve the accuracy of the measurement result. For example, the measurement result may include:

a closest valid measurement result, a measurement result measured when reporting a measurement report to a network side, a measurement result measured when triggering the random access, a measurement result measured when selecting a random access resource, or a measurement result measured when performing a downlink synchronization.

The above-mentioned closest valid measurement result may be a measurement result with the closest effective time, and may specifically be a valid measurement result closest to the time when the random access is initiated, so as to ensure that the measurement result of the selected beam is up-to-date in order to improve the accuracy of the beam selection.

In addition, the measurement result measured when reporting the measurement report to the network side may ensure that the measurement results reported to the network side are the same as the measurement results of the selected beam, thereby ensuring the synchronization of the measurement results on the network side and the user equipment.

The triggering the random access in the process of the non-contention-based random access may refer to that a PHY layer of the UE receives the Physical Downlink Control Channel (PDCCH) instruction (i.e., Msg0) sent by the network side and trigger a random access process. The selecting the random access resource may refer to that the PHY layer of the UE notify the MAC layer to initiate the random access process, and the UE selects the random access resource according to the random access resource indicated by the Msg0.

The triggering the random access in the process of contention-based random access may refer to that a protocol layer (such as the RRC layer) of the UE instructs the MAC layer to trigger the random access process, and the selecting the random access resource may refer to that the MAC layer triggers the random access process and then selects the random access resource.

In this way, the measurement result measured when triggering the random access, the measurement result measured when selecting the random access resource is selected, or the measurement result measured when the downlink synchronization is performed, it is able to ensure the timeliness of the measurement result and improve the accuracy of the beam selection.

Optionally, in the case that the at least one beam is selected at the MAC layer, the signal quality measurement threshold is provided to the MAC layer by the RRC layer or the PHY layer.

In addition, in this implementation manner, the PHY layer may configure the signal quality measurement result information and the signal quality measurement threshold to the MAC layer. The signal quality measurement result information includes a measurement result, and may further include at least one of a measurement result type and a reference signal type corresponding to the measurement result. The signal quality measurement threshold configuration may include a signal quality measurement threshold, and may further include a measurement result type corresponding to the signal quality measurement threshold, and a reference signal type corresponding to the corresponding measurement result.

Step 304: the MAC layer determining a random access resource of the at least one beam according to the random access resource configuration information of the at least one beam, and initiating a random access on the determined random access resource through the at least one beam.

It should be noted that, in this embodiment, the random access resources for initiating random access are not limited to be determined at the MAC layer, but may also be determined and initiated by other protocol layers, which is not limited in this embodiment of the present disclosure.

Optionally, the random access resource configuration information of each beam includes time resource configuration information, and the determined random access resource includes a closest random access resource. For example, the initiating the random access on the determined random access resource through a corresponding beam includes: selecting a closest random access resource from the random access resources of the at least one beam, and initiating a random access on the selected random access resource through the corresponding beam.

The above-mentioned closest random access resource may be understood as after selecting the random access resources of the at least one beam, the random access resource closest to the current time among these random access resources, or may be understood as the random access resource in the random access resources of at least one beam which is closest to the time when the random access resources are determined. Of course, the closest random access resource is the available random access resource.

Since each random access resource has time resource configuration information, the time of each random access resource may be determined. Therefore, when multiple beams are selected in step 303, a closest and the available random access resource may be selected from the multiple beams to initiate a random access, thereby improving the access efficiency.

Optionally, if the random access resource on which the random access is initiated is selected by the MAC layer, and the random access resource configuration information of the at least one beam is provided by the RRC layer or the PHY layer to the MAC layer.

For example, after the UE receives the configuration information in step 301, the RRC layer or the PHY layer selects the random access resource selection at the MAC layer, and provides the random access resource configuration information of at least one beam to the MAC layer. In addition, in the case that the MAC selects the at least one beam, the RRC layer or the PHY layer may provide random access resource configuration information of all beams to the MAC. In the case that at least one beam is selected by the RRC layer or the PHY layer, the RRC layer or the PHY layer may select the random access resource before the MAC layer selects the random access resource, and then the RRC layer or the PHY layer may provide the random access resource configuration information of the at least one beam to the MAC layer. Of course, it is also possible to provide the random access resource configuration information of all beams in this case.

Optionally, the RRC layer or the PHY layer provides the random access resource configuration information of the at least one beam to the MAC layer; or the RRC layer or the PHY layer provides the random access resource configuration information of the at least one beam to the MAC layer, according to an instruction of the MAC layer.

The RRC layer or the PHY layer may provide the random access resource configuration information of the at least one beam to the MAC layer before selecting the random access resource; or the RRC layer or the PHY layer may periodically provide the random access resource configuration information of the at least one beam to the MAC layer.

For the embodiment of providing the random access resource configuration information herein, reference may be made to the embodiment of providing the signal quality measurement result information described above, which is not repeated herein, which can achieve the same technical effects. For example, the PHY layer may provide the random access resource configuration information of the at least one beam to the MAC layer, or the PHY layer may provide the random access resource configuration information of the at least one beam to the MAC layer according to an instruction of the RRC layer.

In this embodiment, a variety of optional implementations are added to the embodiment shown in FIG. 2, and the success rate of random access may be further improved.

Figure 4:
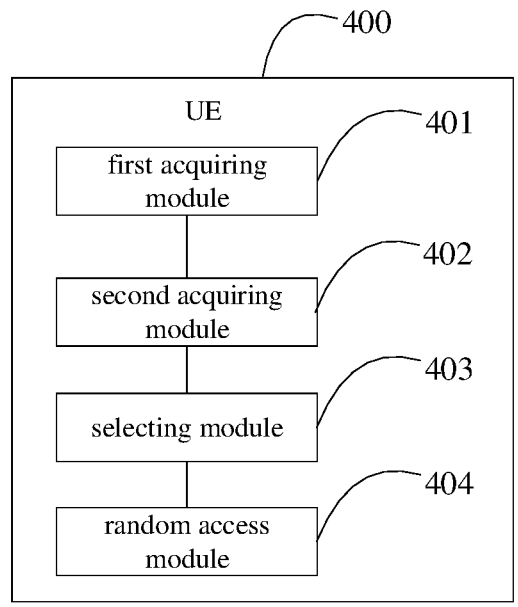
FIG. 4 is a structural diagram of a user equipment in an embodiment of the present disclosure.

FIG. 4 is a structural diagram of a user equipment in an embodiment of the present disclosure. As shown in FIG. 4, the UE 400 includes:

a first acquiring module 401, configured to acquire configuration information, where the configuration information includes random access resource configuration information of at least two beams;

a second acquiring module 402, configured to acquire signal quality measurement result information of the at least two beams;

a selecting module 403, configured to select at least one beam according to the signal quality measurement result information of the at least two beams; and a random access module 404, configured to determine a random access resource of the at least one beam according to the random access resource configuration information of the at least one beam, and initiate a random access on the determined random access resource through the at least one beam.

Those skilled in the art may understand that the above modules may be implemented by software, hardware or a combination of software and hardware.

Optionally, the random access resource configuration information of each beam includes time resource configuration information, and the determined random access resource includes a closest random access resource.

Optionally, the selecting module 403 is configured to: select, by a Media Access Control (MAC) layer, the at least one beam according to the signal quality measurement result information of the at least two beams provided by a Radio Resource Control (RRC) layer or a physical (PHY) layer; or the selecting module 403 is configured to: instruct, by an MAC layer, a RRC layer or a PHY layer to provide the signal quality measurement result information of the at least two beams, and select, by the MAC layer, the at least one beam according to the signal quality measurement result information of the at least two beams; or the selecting module 403 is configured to: select, by a RRC layer or a PHY layer, the at least one beam according to signal quality measurement result information of the at least two beams and indicate, by the RRC layer or the PHY layer, the at least one beam to an MAC layer.

Optionally, the PHY layer provides the signal quality measurement result information to the MAC layer, or the PHY layer provides the signal quality measurement result information to the MAC layer according to an instruction of the RRC layer.

Optionally, in the case that the acquired configuration information includes a signal quality measurement threshold, a measurement result of the at least one beam is equal to or greater than the signal quality measurement threshold, and the at least one beam satisfies a preset measurement condition; or in the case that the acquired configuration information does not include a signal quality measurement threshold, the at least one beam satisfies a preset measurement condition.

Optionally, the acquired configuration information further includes at least one of a measurement result type and a reference signal type corresponding to the measurement result;

the measurement result includes:

a measurement result of the measurement result type; or a measurement result of the reference signal type; or a measurement result of the measurement result type in a measurement result of the reference signal type.

Optionally, in the case that the at least one beam is selected at the MAC layer, the signal quality measurement threshold is provided to the MAC layer by the RRC layer or the PHY layer.

Optionally, the preset measurement condition includes one or more of:

a corresponding reference signal is detected, the measurement result is a valid measurement result, and being in a downlink synchronization state, where each beam corresponds to one reference signal.

Optionally, the measurement result includes:

a closest valid measurement result, a measurement result measured when reporting a measurement report to a network side, a measurement result measured when triggering the random access, a measurement result measured when selecting a random access resource, or a measurement result measured when performing a downlink synchronization.

Optionally, the random access resource configuration information of each beam includes one or more of:

time resource configuration information, frequency resource configuration information, coding resource configuration information and spatial resource configuration information.

Optionally, the time resource configuration information includes one or more of:

a radio frame configuration, a subframe configuration and a slot configuration;

the frequency resource configuration information includes one or more of:

a frequency point identity, a minimum bandwidth agreed in a protocol, a Bandwidth Part (BWP) identity, a Physical Resource Block (PRB) identity, a cell identity and a subcarrier interval;

the coding resource configuration information includes a random access preamble;

the spatial resource configuration information includes one or more of:

identity information of beam, identity information of beam pair and a transmission node identity;

the identity information of beam includes one or more of:

a Beam ID, a Synchronization Signal Block (SSB) identity and a Channel State Information Reference Signal (CSI-RS) identity.

Optionally, the random access resource on which the random access is initiated is selected by an MAC layer, and the random access resource configuration information of the at least one beam is provided to the MAC layer by an RRC layer or a PHY layer.

Optionally, the RRC layer or the PHY layer provides the random access resource configuration information of the at least one beam to the MAC layer; or the RRC layer or the PHY layer provides the random access resource configuration information of the at least one beam to the MAC layer, according to an instruction of the MAC layer.

Optionally, the PHY layer provides the random access resource configuration information of the at least one beam to the MAC layer; or the PHY layer provides the random access resource configuration information of the at least one beam to the MAC layer according to an instruction of the RRC layer.

Optionally, the first acquiring module is configured to acquire the configuration information configured by a network side or defined by a protocol.

The user equipment provided in the embodiment of the present disclosure may implement the processes implemented by the user equipment in the method embodiments in FIG. 2 to FIG. 3. To avoid repetition, details are not described herein, and the success rate of random access is improved.

Figure 5:
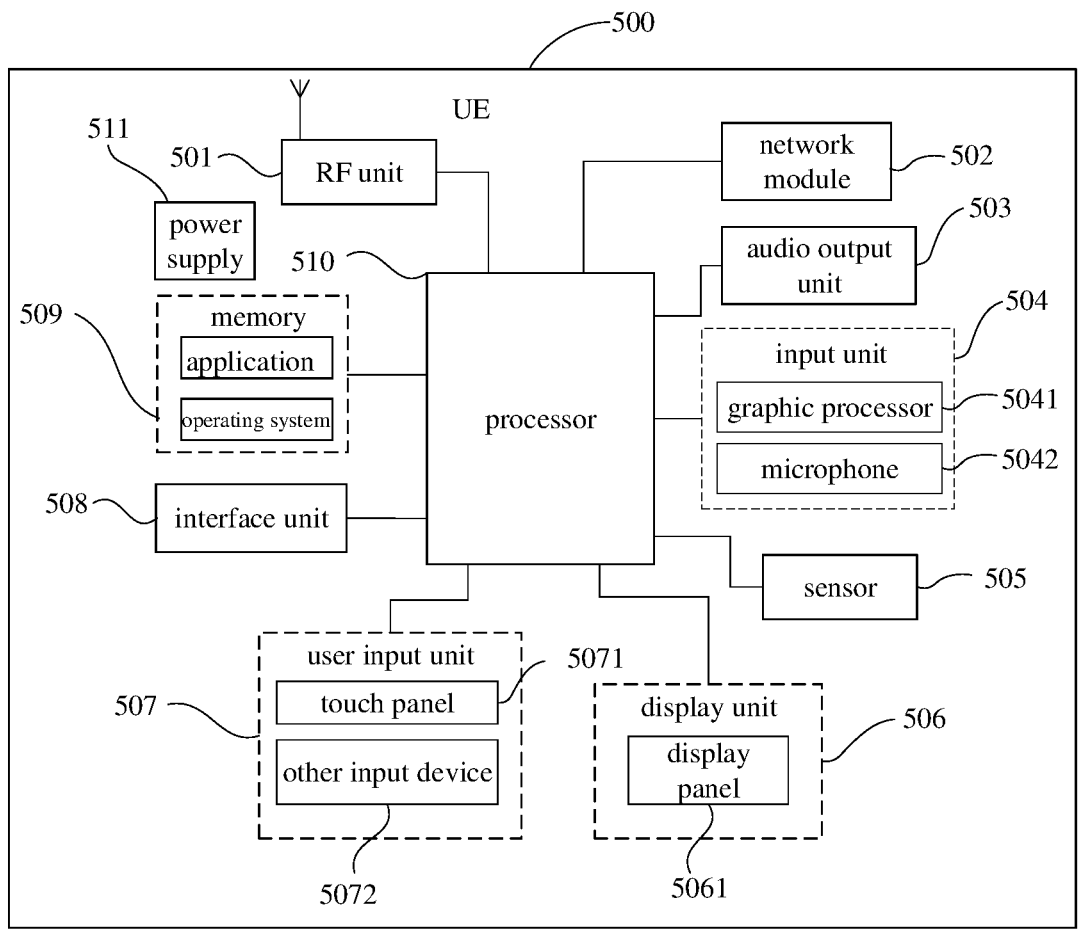
FIG. 5 is another structural diagram of a user equipment in an embodiment of the present disclosure.

FIG. 5 is another structural diagram of a user equipment in an embodiment of the present disclosure.

The user equipment 500 includes, but is not limited to, a radio frequency unit 501, a network module 502, an audio output unit 503, an input unit 504, a sensor 505, a display unit 506, a user input unit 507, an interface unit 508, a memory 509, a processor 510, and Power supply 511 and other components. Those skilled in the art can understand that the structure of the user equipment shown in FIG. 5 does not constitute a limitation on the user equipment. The user equipment may include more or fewer components than shown in the figure, or a combination of some components, or different component layouts. In the embodiment of the present disclosure, the user equipment includes, but is not limited to, a mobile phone, a tablet computer, a notebook computer, a handheld computer, a vehicle-mounted user equipment, a wearable device, and a pedometer.

The processor 510 is configured acquire configuration information, where the configuration information includes random access resource configuration information of at least two beams;

acquire signal quality measurement result information of the at least two beams;

select at least one beam according to the signal quality measurement result information of the at least two beams; and determine a random access resource of the at least one beam according to the random access resource configuration information of the at least one beam, and initiate a random access on the determined random access resource through the at least one beam.

Optionally, the random access resource configuration information of each beam includes time resource configuration information, and the determined random access resource includes a closest random access resource.

Optionally, the processor 510 is configured to:

select, by a Media Access Control (MAC) layer, the at least one beam according to the signal quality measurement result information of the at least two beams provided by a Radio Resource Control (RRC) layer or a physical (PHY) layer; or instruct, by an MAC layer, a RRC layer or a PHY layer to provide the signal quality measurement result information of the at least two beams, and select, by the MAC layer, the at least one beam according to the signal quality measurement result information of the at least two beams; or select, by a RRC layer or a PHY layer, the at least one beam according to signal quality measurement result information of the at least two beams and indicate, by the RRC layer or the PHY layer, the at least one beam to an MAC layer.

Optionally, the PHY layer provides the signal quality measurement result information to the MAC layer, or the PHY layer provides the signal quality measurement result information to the MAC layer according to an instruction of the RRC layer.

Optionally, in the case that the acquired configuration information includes a signal quality measurement threshold, a measurement result of the at least one beam is equal to or greater than the signal quality measurement threshold, and the at least one beam satisfies a preset measurement condition; or in the case that the acquired configuration information does not include a signal quality measurement threshold, the at least one beam satisfies a preset measurement condition.

Optionally, the acquired configuration information further includes at least one of a measurement result type and a reference signal type corresponding to the measurement result;

the measurement result includes:

a measurement result of the measurement result type; or a measurement result of the reference signal type; or a measurement result of the measurement result type in a measurement result of the reference signal type.

Optionally, in the case that the at least one beam is selected at the MAC layer, the signal quality measurement threshold is provided to the MAC layer by the RRC layer or the PHY layer.

Optionally, the preset measurement condition includes one or more of:

a corresponding reference signal is detected, the measurement result is a valid measurement result, and being in a downlink synchronization state, where each beam corresponds to one reference signal.

Optionally, the measurement result includes:

a closest valid measurement result, a measurement result measured when reporting a measurement report to a network side, a measurement result measured when triggering the random access, a measurement result measured when selecting a random access resource, or a measurement result measured when performing a downlink synchronization.

Optionally, the random access resource configuration information of each beam includes one or more of:

time resource configuration information, frequency resource configuration information, coding resource configuration information and spatial resource configuration information.

Optionally, the time resource configuration information includes one or more of:

a radio frame configuration, a subframe configuration and a slot configuration;

the frequency resource configuration information includes one or more of:

a frequency point identity, a minimum bandwidth agreed in a protocol, a Bandwidth Part (BWP) identity, a Physical Resource Block (PRB) identity, a cell identity and a subcarrier interval;

the coding resource configuration information includes a random access preamble;

the spatial resource configuration information includes one or more of:

identity information of beam, identity information of beam pair and a transmission node identity.

Optionally, the identity information of beam includes one or more of:

a Beam ID, a Synchronization Signal Block (SSB) identity and a Channel State Information Reference Signal (CSI-RS) identity.

Optionally, the random access resource on which the random access is initiated is selected by an MAC layer, and the random access resource configuration information of the at least one beam is provided to the MAC layer by an RRC layer or a PHY layer.

Optionally, the RRC layer or the PHY layer provides the random access resource configuration information of the at least one beam to the MAC layer; or the RRC layer or the PHY layer provides the random access resource configuration information of the at least one beam to the MAC layer, according to an instruction of the MAC layer.

Optionally, the PHY layer provides the random access resource configuration information of the at least one beam to the MAC layer; or the PHY layer provides the random access resource configuration information of the at least one beam to the MAC layer according to an instruction of the RRC layer.

Optionally, the processor 510 is configured to acquire the configuration information configured by a network side or defined by a protocol.

The above user equipment may improve the success rate of random access.

It should be understood that, in the embodiment of the present disclosure, the radio frequency unit 501 may be used to receive and send signals during the transmission and reception of information or during a call. Specifically, the downlink data from the base station is received and processed by the processor 510. The uplink data is sent to the base station. Generally, the radio frequency unit 501 includes, but is not limited to, an antenna, at least one amplifier, a transceiver, a coupler, a low noise amplifier, a duplexer, and the like. In addition, the radio frequency unit 501 can also communicate with a network and other devices through a wireless communication system.

The user equipment provides the user with wireless broadband Internet access through the network module 502, such as helping the user to send and receive email, browse web pages, and access streaming media.

The audio output unit 503 may convert audio data received by the radio frequency unit 501 or the network module 502 or stored in the memory 509 into audio signals and output them as sound. Moreover, the audio output unit 503 may also provide audio output (for example, call signal reception sound, message reception sound, etc.) related to a specific function performed by the user equipment 500. The audio output unit 503 includes a speaker, a buzzer, a receiver, and the like.

The input unit 504 is used for receiving audio or video signals. The input unit 504 may include a graphics processing unit (GPU) 5041 and a microphone 5042. The graphics processor 5041 pairs images of still pictures or videos obtained by an image capture device (such as a camera) in a video capture mode or an image capture mode. Data is processed. The processed image frames may be displayed on the display unit 506. The image frames processed by the graphics processor 5041 may be stored in the memory 509 (or other storage medium) or transmitted via the radio frequency unit 501 or the network module 502. The microphone 5042 can receive sound, and can process such sound into audio data. The processed audio data can be converted into a format that can be transmitted to a mobile communication base station via the radio frequency unit 501 in the case of a telephone call mode and output.

The user equipment 500 further includes at least one sensor 505, such as a light sensor, a motion sensor, and other sensors. Specifically, the light sensor includes an ambient light sensor and a proximity sensor. The ambient light sensor can adjust the brightness of the display panel 5061 according to the brightness of the ambient light. The proximity sensor can close the display panel 5061 and/or backlight when the user equipment 500 moves to the ear. As a type of motion sensor, the accelerometer sensor can detect the magnitude of acceleration in various directions (usually three axes), and can detect the magnitude and direction of gravity when it is stationary, which can be used to identify the user equipment posture (such as horizontal and vertical screen switching, related games, Magnetometer attitude calibration), vibration recognition related functions (such as pedometer, tap), etc. Sensor 505 can also include fingerprint sensor, pressure sensor, iris sensor, molecular sensor, gyroscope, barometer, hygrometer, thermometer, Infrared sensors, etc. are not repeated here.

The display unit 506 is configured to display information input by the user or information provided to the user. The display unit 506 may include a display panel 5061. The display panel 5061 may be configured in the form of a liquid crystal display (LCD), an organic light-emitting diode (OLED), or the like.

The user input unit 507 may be used to receive inputted numeric or character information, and generate key signal inputs related to user settings and function control of a user equipment. Specifically, the user input unit 507 includes a touch panel 5071 and other input devices 5072. Touch panel 5071, also known as touch screen, can collect user's touch operations on or near it (such as the user using a finger, stylus, etc. any suitable object or accessory on touch panel 5071 or near touch panel 5071 operating). The touch panel 5071 may include two parts, a touch detection device and a touch controller. Among them, the touch detection device detects the user's touch position, and detects the signal caused by the touch operation, and transmits the signal to the touch controller; the touch controller receives touch information from the touch detection device, converts it into contact coordinates, and sends it to the processor 510, receive the command sent by the processor 510 and execute it. In addition, various types such as resistive, capacitive, infrared, and surface acoustic wave can be used to implement the touch panel 5071. In addition to the touch panel 5071, the user input unit 507 may also include other input devices 5072. Specifically, other input devices 5072 may include, but are not limited to, a physical keyboard, function keys (such as volume control keys, switch keys, etc.), a trackball, a mouse, and a joystick, and details are not described herein again.

Further, the touch panel 5071 may be overlaid on the display panel 5061. After the touch panel 5071 detects a touch operation on or near the touch panel 5071, the touch panel 5071 transmits the touch operation to the processor 510 to determine the type of touch event. The type of event provides corresponding visual output on the display panel 5061. Although in FIG. 5, the touch panel 5071 and the display panel 5061 are implemented as two independent components to implement input and output functions of the user equipment, in some embodiments, the touch panel 5071 and the display panel 5061 may be integrated The implementation of the input and output functions of the user equipment is not specifically limited here.

The interface unit 508 is an interface through which an external device is connected to the user equipment 500. For example, the external device may include a wired or wireless headset port, an external power (or battery charger) port, a wired or wireless data port, a memory card port, a port for connecting a device with an identity module, and audio input/output (I/O) port, video I/O port, headphone port, and more. The interface unit 508 may be used to receive an input (e.g., data information, power, etc.) from an external device and transmit the received input to one or more elements in the user equipment 500 or may be used in the user equipment 500 and externally Transfer data between devices.

The memory 509 can be used to store software programs and various data. The memory 509 may mainly include a storage program area and a storage data area, wherein the storage program area may store an operating system, at least one application required by a function (such as a sound playback function, an image playback function, etc.); the storage data area may store data according to data (such as audio data, phone book, etc.) created by the use of mobile phones. In addition, the memory 509 may include a high-speed random access memory, and may further include a non-volatile memory, such as at least one magnetic disk storage device, a flash memory device, or other volatile solid-state storage devices.

The processor 510 is a control center of the user equipment, and uses various interfaces and lines to connect various parts of the entire user equipment. The processor 510 runs or executes software programs and/or modules stored in the memory 509, and calls data stored in the memory 509. To perform various functions of the user equipment and process data, so as to monitor the user equipment as a whole. The processor 510 may include one or more processing units; preferably, the processor 510 may integrate an application processor and a modem processor, wherein the application processor mainly processes an operating system, a user interface, and an application program, etc. The processor mainly handles wireless communication. It can be understood that the foregoing modem processor may not be integrated into the processor 510.

The user equipment 500 may further include a power source 511 (such as a battery) for supplying power to various components. Preferably, the power source 511 may be logically connected to the processor 510 through a power management system, so as to manage charging, discharging, and power consumption management through the power management system and the like.

In addition, the user equipment 500 includes some functional modules that are not shown, and details are not described herein again.

Optionally, a user equipment is further provided in an embodiment of the present disclosure, including a processor 510, a memory 509, and a computer program stored in the memory 509 and executable on the processor 510. The computer program is executed by the processor 510 to perform the random access method hereinabove, and the same technical effects can be achieved. To avoid repetition, details are not described herein again.

A computer-readable storage medium is further provided in an embodiment of the present disclosure. A computer program is stored in the computer-readable storage medium, and the program is executed by a processor to perform the random access method hereinabove, and the same technical effects may be achieved. To avoid repetition, details thereof are omitted herein. The computer-readable storage medium is, for example, a read-only memory (ROM), a random access memory (RAM), a magnetic disk or an optical disk.

It should be noted that, in the present disclosure, the terms "comprising", "comprise" or any other variants thereof are intended to cover non-exclusive inclusion, so that a process, method, article or device including a series of elements includes not only those elements, It also includes other elements not explicitly listed, or elements inherent to such a process, method, article, or device. Without more restrictions, an element limited by the sentence "comprising a . . . " does not exclude that there are other identical elements in the process, method, article, or device that includes the element.

Through the description of the above embodiments, those skilled in the art can clearly understand that the methods in the above embodiments can be implemented by means of software plus a necessary universal hardware platform, and of course, also by hardware, but in many cases the former is better. Implementation. Based on such an understanding, the technical solution of the present disclosure, in essence, or a part that contributes to the prior art, can be embodied in the form of a software product, which is stored in a storage medium (such as ROM/RAM, magnetic disk, optical disc) includes several instructions for causing a terminal (which may be a mobile phone, a computer, a server, an air conditioner, or a network device, etc.) to execute the methods described in the embodiments of the present disclosure.

The embodiments of the present disclosure have been described above with reference to the drawings, but the present disclosure is not limited to the above specific embodiments, and the above specific embodiments are only for illustration. Those of ordinary skill in the art may make serval improvement without departing from the principle of the present disclosure and the scope of the claims, and these improvements shall fall into the scope of the present disclosure.

What is claimed is:

1. A random access method, comprising:
    acquiring configuration information, wherein the configuration information comprises random access resource configuration information of at least two beams;
    acquiring signal quality measurement result information of the at least two beams;
    selecting at least one beam according to the signal quality measurement result information of the at least two beams; and
    determining a random access resource of the at least one beam according to the random access resource configuration information of the at least one beam, and initiating a random access on the determined random access resource through the at least one beam;
    wherein the selecting the at least one beam according to the signal quality measurement result information of the at least two beams comprises:
    selecting, by a Media Access Control (MAC) layer, the at least one beam according to the signal quality measurement result information of the at least two beams provided by a Radio Resource Control (RRC) layer or a physical (PHY) layer; or
    instructing, by an MAC layer, a RRC layer or a PHY layer to provide the signal quality measurement result information of the at least two beams, and selecting, by the MAC layer, the at least one beam according to the signal quality measurement result information of the at least two beams; or
    selecting, by a RRC layer or a PHY layer, the at least one beam according to signal quality measurement result information of the at least two beams and indicating, by the RRC layer or the PHY layer, the at least one beam to an MAC layer;
    in the case that the acquired configuration information comprises a signal quality measurement threshold, a measurement result of the at least one beam is equal to or greater than the signal quality measurement threshold, and the at least one beam satisfies a preset measurement condition; or
    in the case that the acquired configuration information does not comprise a signal quality measurement threshold, the at least one beam satisfies a preset measurement condition.

2. The random access method according to claim 1, wherein the random access resource configuration information of each beam comprises time resource configuration information, and the determined random access resource comprises a closest random access resource.

3. The random access method according to claim 1, wherein the PHY layer provides the signal quality measurement result information to the MAC layer, or the PHY layer provides the signal quality measurement result information to the MAC layer according to an instruction of the RRC layer.

4. The random access method according to claim 1, wherein the acquired configuration information further comprises at least one of a measurement result type and a reference signal type corresponding to the measurement result;
    the measurement result comprises:
    a measurement result of the measurement result type; or
    a measurement result of the reference signal type; or a measurement result of the measurement result type in a measurement result of the reference signal type.

5. The random access method according to claim 1, wherein in the case that the at least one beam is selected at the MAC layer, the signal quality measurement threshold is provided to the MAC layer by the RRC layer or the PHY layer;

or, the preset measurement condition comprises one or more of:

a corresponding reference signal is detected, the measurement result is a valid measurement result, and being in a downlink synchronization state, wherein each beam corresponds to one reference signal.

6. The random access method according to claim 1, wherein the measurement result comprises:

a closest valid measurement result, a measurement result measured when reporting a measurement report to a network side, a measurement result measured when triggering the random access, a measurement result measured when selecting a random access resource, or a measurement result measured when performing a downlink synchronization.

7. The random access method according to claim 1, wherein the random access resource configuration information of each beam comprises one or more of: time resource configuration information, frequency resource configuration information, coding resource configuration information and spatial resource configuration information;

wherein the time resource configuration information comprises one or more of: a radio frame configuration, a subframe configuration and a slot configuration;

the frequency resource configuration information comprises one or more of: a frequency point identity, a minimum bandwidth agreed in a protocol, a Bandwidth Part (BWP) identity, a Physical Resource Block (PRB) identity, a cell identity and a subcarrier interval;

the coding resource configuration information comprises a random access preamble;

the spatial resource configuration information comprises one or more of: identity information of beam, identity information of beam pair and a transmission node identity;

wherein the identity information of beam comprises one or more of: a Beam ID, a Synchronization Signal Block (SSB) identity and a Channel State Information Reference Signal (CSI-RS) identity.

8. The random access method according to claim 1, wherein the random access resource on which the random access is initiated is selected by an MAC layer, and the random access resource configuration information of the at least one beam is provided to the MAC layer by an RRC layer or a PHY layer.

9. A User Equipment (UE), comprising: a memory, a processor and a program stored in the memory and executable on the processor, wherein the program is executed by the processor to:

acquire configuration information, wherein the configuration information comprises random access resource configuration information of at least two beams;

acquire signal quality measurement result information of the at least two beams;

select at least one beam according to the signal quality measurement result information of the at least two beams; and determine a random access resource of the at least one beam according to the random access resource configuration information of the at least one beam, and initiate a random access on the determined random access resource through the at least one beam;

wherein the program is executed by the processor to:

select, by a Media Access Control (MAC) layer, the at least one beam according to the signal quality measurement result information of the at least two beams provided by a Radio Resource Control (RRC) layer or a physical (PHY) layer; or instruct, by an MAC layer, a RRC layer or a PHY layer to provide the signal quality measurement result information of the at least two beams, and select, by the MAC layer, the at least one beam according to the signal quality measurement result information of the at least two beams; or select, by a RRC layer or a PHY layer, the at least one beam according to signal quality measurement result information of the at least two beams and indicate, by the RRC layer or the PHY layer, the at least one beam to an MAC layer;

in the case that the acquired configuration information comprises a signal quality measurement threshold, a measurement result of the at least one beam is equal to or greater than the signal quality measurement threshold, and the at least one beam satisfies a preset measurement condition; or in the case that the acquired configuration information does not comprise a signal quality measurement threshold, the at least one beam satisfies a preset measurement condition.

10. The UE according to claim 9, wherein the random access resource configuration information of each beam comprises time resource configuration information, and the determined random access resource comprises a closest random access resource.

11. The UE according to claim 9, wherein the PHY layer provides the signal quality measurement result information to the MAC layer, or the PHY layer provides the signal quality measurement result information to the MAC layer according to an instruction of the RRC layer.

12. The UE according to claim 9, wherein the acquired configuration information further comprises at least one of a measurement result type and a reference signal type corresponding to the measurement result;

the measurement result comprises:

a measurement result of the measurement result type; or a measurement result of the reference signal type; or a measurement result of the measurement result type in a measurement result of the reference signal type.

13. The UE according to claim 9, wherein in the case that the at least one beam is selected at the MAC layer, the signal quality measurement threshold is provided to the MAC layer by the RRC layer or the PHY layer;

or, the preset measurement condition comprises one or more of:

a corresponding reference signal is detected, the measurement result is a valid measurement result, and being in a downlink synchronization state, wherein each beam corresponds to one reference signal.

14. The UE according to claim 9, wherein the measurement result comprises:

a closest valid measurement result, a measurement result measured when reporting a measurement report to a network side, a measurement result measured when triggering the random access, a measurement result measured when selecting a random access resource, or a measurement result measured when performing a downlink synchronization.

15. The UE according to claim 9, wherein the random access resource configuration information of each beam comprises one or more of: time resource configuration information, frequency resource configuration information, coding resource configuration information and spatial resource configuration information;

wherein the time resource configuration information comprises one or more of: a radio frame configuration, a subframe configuration and a slot configuration;

the frequency resource configuration information comprises one or more of: a frequency point identity, a minimum bandwidth agreed in a protocol, a Bandwidth Part (BWP) identity, a Physical Resource Block (PRB) identity, a cell identity and a subcarrier interval;

the coding resource configuration information comprises a random access preamble;

the spatial resource configuration information comprises one or more of: identity information of beam, identity information of beam pair and a transmission node identity;

wherein the identity information of beam comprises one or more of: a Beam ID, a Synchronization Signal Block (SSB) identity and a Channel State Information Reference Signal (CSI-RS) identity.

16. The UE according to claim 9, wherein the random access resource on which the random access is initiated is selected by an MAC layer, and the random access resource configuration information of the at least one beam is provided to the MAC layer by an RRC layer or a PHY layer.

17. A computer-readable storage medium, wherein a program is stored in the computer-readable storage medium, and the program is executed by a processor to perform:

acquiring configuration information, wherein the configuration information comprises random access resource configuration information of at least two beams;

acquiring signal quality measurement result information of the at least two beams;

selecting at least one beam according to the signal quality measurement result information of the at least two beams; and determining a random access resource of the at least one beam according to the random access resource configuration information of the at least one beam, and initiating a random access on the determined random access resource through the at least one beam;

wherein the selecting the at least one beam according to the signal quality measurement result information of the at least two beams comprises:

selecting, by a Media Access Control (MAC) layer, the at least one beam according to the signal quality measurement result information of the at least two beams provided by a Radio Resource Control (RRC) layer or a physical (PHY) layer; or instructing, by an MAC layer, a RRC layer or a PHY layer to provide the signal quality measurement result information of the at least two beams, and selecting, by the MAC layer, the at least one beam according to the signal quality measurement result information of the at least two beams; or selecting, by a RRC layer or a PHY layer, the at least one beam according to signal quality measurement result information of the at least two beams and indicating, by the RRC layer or the PHY layer, the at least one beam to an MAC layer;

in the case that the acquired configuration information comprises a signal quality measurement threshold, a measurement result of the at least one beam is equal to or greater than the signal quality measurement threshold, and the at least one beam satisfies a preset measurement condition; or in the case that the acquired configuration information does not comprise a signal quality measurement threshold, the at least one beam satisfies a preset measurement condition.

18. The computer-readable storage medium according to claim 17, wherein the random access resource configuration information of each beam comprises time resource configuration information, and the determined random access resource comprises a closest random access resource.

19. The computer-readable storage medium according to claim 17, wherein the PHY layer provides the signal quality measurement result information to the MAC layer, or the PHY layer provides the signal quality measurement result information to the MAC layer according to an instruction of the RRC layer.

20. The computer-readable storage medium according to claim 17, wherein the measurement result comprises:

a closest valid measurement result, a measurement result measured when reporting a measurement report to a network side, a measurement result measured when triggering the random access, a measurement result measured when selecting a random access resource, or a measurement result measured when performing a downlink synchronization.

* * * * *